United States Patent [19]
Hart

[11] Patent Number: 5,172,626
[45] Date of Patent: Dec. 22, 1992

[54] STABILIZED PISTON SKIRT HAVING VARYING PEAKS AND CONCAVE SURFACES

[75] Inventor: Richard W. Hart, Warren, Mich.

[73] Assignee: General Motors Corporation, Detroit, Mich.

[21] Appl. No.: 748,732

[22] Filed: Aug. 22, 1991

[51] Int. Cl.$^5$ .............................. F16J 1/00; F16J 1/04; F02F 3/00
[52] U.S. Cl. .......................................... 92/177; 92/233; 92/174; 123/193.6
[58] Field of Search ................. 92/174, 177, 233, 234, 92/235, 236; 123/193.6

[56] References Cited

U.S. PATENT DOCUMENTS

| | | | |
|---|---|---|---|
| 1,575,751 | 3/1926 | Fox | 92/234 |
| 2,186,375 | 1/1940 | Flammang | 92/233 |
| 2,190,207 | 2/1940 | Dillon | 92/233 |
| 2,352,592 | 6/1944 | Alexandrescu | 92/236 X |
| 2,513,814 | 6/1950 | Moore | 92/233 |
| 4,648,309 | 3/1987 | Schellmann | 92/233 |
| 4,656,711 | 4/1987 | Yagi et al. | |
| 4,691,622 | 9/1987 | Sander et al. | 92/233 |
| 4,716,817 | 1/1988 | Ripberger et al. | 92/233 X |
| 4,809,652 | 3/1989 | Essig et al. | |
| 4,831,919 | 5/1989 | Bruni | 92/233 |
| 4,864,986 | 9/1989 | Bethel et al. | 123/193.6 |
| 4,903,580 | 2/1990 | Bruni | 123/193.6 X |
| 5,107,807 | 4/1992 | Arai et al. | 92/233 X |

FOREIGN PATENT DOCUMENTS

| | | | |
|---|---|---|---|
| 14164 | 4/1972 | Japan | 123/193.6 |
| 85152 | 4/1987 | Japan | 123/193.6 |
| 1002060 | 8/1965 | United Kingdom | 123/193.6 |

Primary Examiner—Edward K. Look
Assistant Examiner—John Ryznic
Attorney, Agent, or Firm—Robert J. Outland

[57] ABSTRACT

A piston with a skirt shaped to accommodate distortion by changing thermal and load conditions is further modified to increase stability and broaden load distribution to reduce contact forces and wear by providing maximum radii lines on either side of a longitudinal thrust plant with reduced radius regions forming apparent concavities therebetween.

10 Claims, 2 Drawing Sheets

STABILIZED PISTON SKIRT HAVING VARYING PEAKS AND CONCAVE SURFACES

TECHNICAL FIELD

This invention relates to pistons for internal combustion engines and particularly to the shapes of skirts for such pistons.

BACKGROUND

It is known in the art relating to engine pistons to develop a skirt shape through various methods involving theoretical design and physical engine testing to define an acceptable shape for each engine application. It is intended to accommodate thermal growth, combustion force deformations and stiffness of the piston and its associated cylinder in operation while minimizing lateral and tilting motions of the piston that cause noise and wear. In one prior proposal, an abradable coating is provided on a piston skirt which is then run in an engine to generate the desired shape of the skirt for use in a production version of the piston.

Whatever the method of development used, it is now common in automotive vehicle engine pistons to provide a skirt having a generally ovalized configuration in lateral cross section with a major axis between the thrust and counterthrust sides. The skirt may also include a variable longitudinal profile generally having a smaller variable diameter toward the top of the skirt near the piston ring belt and a larger diameter near the bottom and having the bottom and top edge diameters slightly reduced.

SUMMARY OF THE INVENTION

The present invention provides an improved piston skirt profile which provides improved stability and reduced lateral and rotational (tilting) piston motion, especially at low temperatures, for reduced noise as well as improved distribution of thrust loads on the piston skirt to reduce wear and extend durability.

Broadly, the skirt profile is formed by smoothly varying radii and includes the provision of slight concavities, or relative recesses, in the lateral cross section profiles along the thrust plane of the piston. This results in high points of piston radii at specified angles on either side of the thrust plane which stabilize the motion of the piston skirt in operation, including during warm-up. The high points provide load carrying regions on either side of the thrust plane which support the piston and limit wear by reducing elastic deformation.

The skirt is designed for each engine application to accommodate thermal growth and combustion force deformations of the piston and its associated cylinder as well as the flexibility (or stiffness) of the skirt and cylinder walls under the maximum thrust forces applied in operation so that the skirt load is widely distributed at maximum loads. At lighter loads, the recess acts to retain lubricating oil for better lubrication of the skirt to reduce wear as well as aid noise reduction.

In a preferred embodiment, the skirt lateral profiles are formed using a preferred mathematical relationship or formula which is easily utilized by computer numerically controlled machines to form the desired configuration which comprises a smooth, continuous skirt shape. The longitudinal profiles are preferably modified to provide deeper recesses at the top, or ring belt, end of the skirt with gradually reduced recess depths at the lateral cross sections moving toward the bottom.

These and other features and advantages of the invention will be more fully understood from the following description of certain specific embodiments of the invention taken together with the accompanying drawings.

BRIEF DRAWING DESCRIPTION

DETAILED DESCRIPTION

Figure 1:
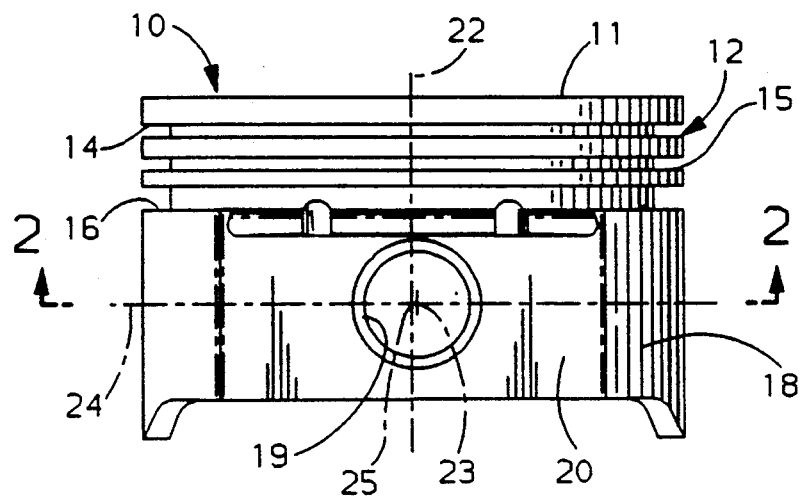
FIG. 1 is a semi-schematic side view from the wrist pin axis of a piston with a skirt shaped according to the invention.
Figure 2:
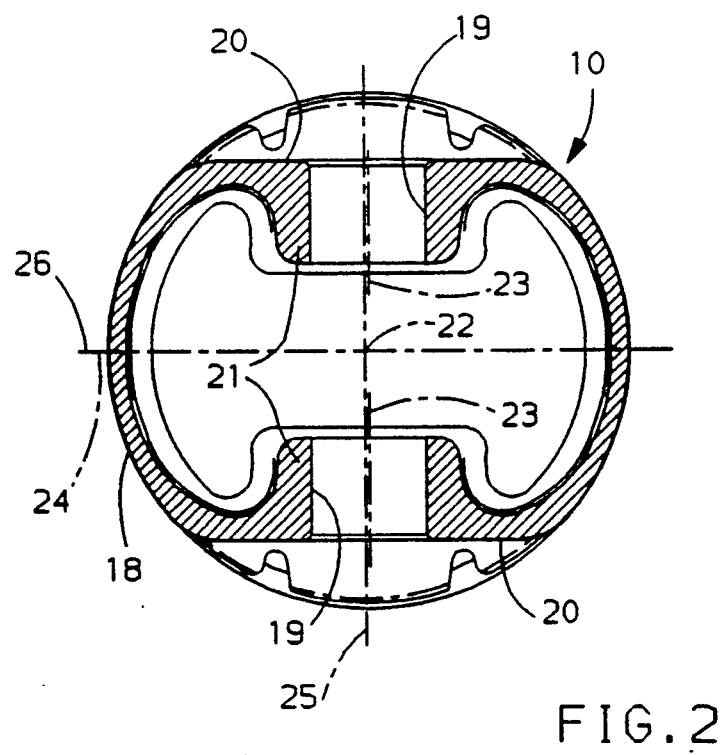
FIG. 2 is a cross-sectional view taken normal to the piston axis at the plane of the line 2—2 of FIG. 1.

Referring now to FIGS. 1 and 2 of the drawings in detail, numeral 10 generally indicates a piston for an internal combustion engine. The piston 10 includes the usual crown or head 11 that defines a top, combustion exposed, surface when installed in an engine cylinder, not shown. Below the head is a ring belt 12 having a top ring groove 14, second ring groove 15 and third ring groove 16 adapted to receive conventional top and second compression rings and an oil ring, not shown. Below the ring belt is a skirt 18 through which extends a piston pin bore 19.

The exterior of the skirt has flats 20 that extend on either side of the pin bore 19 over the skirt length. The interior of the skirt and the lower portion of the ring belt are hollow except for bosses 21 surrounding the bore 19 which extend upward along the interior of the skirt 18 to the head 11 to carry gas forces directly from the head to the piston pin (not shown).

The piston has a longitudinal or main axis 22 on which the exterior machining of the skirt and ring belt is centered, a piston pin axis 23 on which the bore 19 is centered and a thrust axis 24 normal to the pin axis 23. A transverse axis 25, parallel with the pin axis 23 intersects the main axis 22 and thrust axis 24 at a common point. If desired, the pin axis 23 may be coincident with rather than offset from the transverse axis 25. The main axis and the thrust axis define a thrust plane 26 along which the side thrust forces on the piston in operation are nominally applied.

The foregoing describes portions of the piston construction which are conventional, it being understood that various alternative conventional configurations might also be utilized in carrying out the invention. For example, the skirt may be made as a continuously curved cylinder without flats 20 or the skirt may be interrupted by open areas instead of flats adjacent the pin bosses. The general features of the invention may be applied to such alternative piston embodiments as well as to others not described.

A normal goal in piston design is to select the skirt dimensions so that the piston will slide freely in the cylinder under all conditions of operation but that lateral and rotational motion, sometimes called piston slap, will be minimized to reduce impact loading and audible noise. Accordingly, in pistons of the type described, the skirt and ring belt are commonly formed with a so-called barrel shape in which the largest diameter in the longitudinal profile is located along the thrust axis 24 normal to the piston pin bore and the diameters become progressively smaller above and below the pin bore. Also, it is common to form the skirt, as viewed in transverse section normal to the main axis 22, with a generally elliptical shape having the minor axis aligned with the pin axis and the major axis aligned with the thrust axis in the thrust plane. These departures from a right circular cylindrical configuration are intended to accommodate both the thermal growth of the piston and cylinder during operation and the deflections of the skirt and cylinder wall under the various load and speed conditions encountered.

I have found, through analysis of particular engine cylinder and piston constructions with their thermal growth and load deflection characteristics together with operational testing of the improved components, an improved transverse cross-sectional shape for an engine piston skirt. The improved shape, properly applied can better distribute thrust forces over the running surfaces and thereby reduce maximum skirt contact pressures and wear. In addition, lateral motion, tilting and piston slap may be reduced during warm-up and skirt lubrication can be improved.

The improved configuration involves modification of the round or elliptical cross section to provide relative recesses or apparent concavities along and adjacent the thrust plane so that the major thrust loads are distributed primarily over peak areas on either side of the thrust plane. This broadened load distribution tends to stabilize the piston motion in the cylinder and also provides a recess for retention of lubricant along the thrust plane on the thrust and counterthrust surfaces of the piston.

Figure 3:
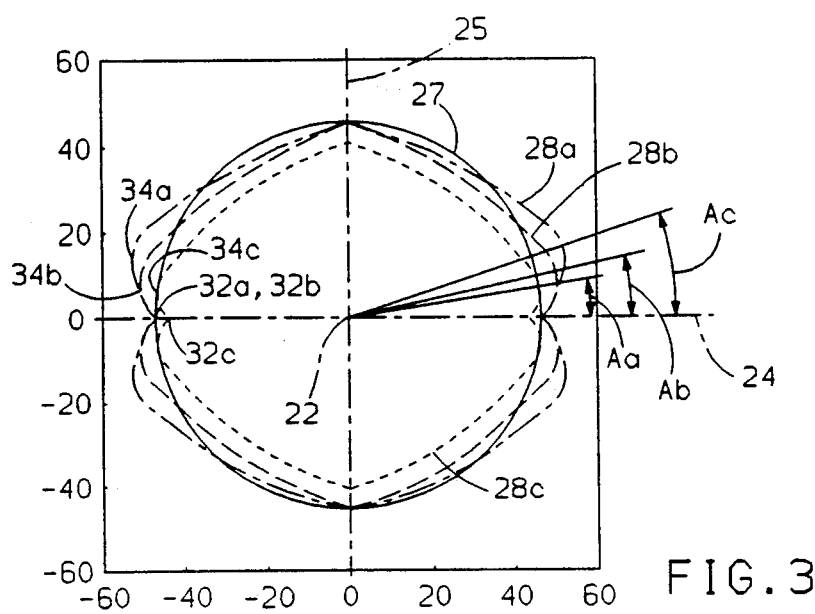
FIG. 3 is a diagrammatic view showing the exterior shapes of the tops of the skirts, with eccentricity magnified, for a family of pistons having skirts formed according to the invention.

FIG. 3 illustrates the general configuration of preferred piston skirt cross-sectional shapes for a family of pistons formed according to the invention. The shapes are compared to a nominal circular diameter 27 from which the configurations 28 of two larger pistons indicated by dashed lines 28a and 28b are defined. The shapes illustrated are for the top of the piston skirt and the deviations from the circular diameter are enlarged about 500 times for clarity, as the actual deviations are too small to be apparent to the eye. A third skirt shape for a smaller diameter piston is illustrated by line 28c.

The skirt configurations are universally characterized by apparent concavities having nominal diameters 32a–c in the thrust plane 26 on both the thrust and counterthrust sides of the piston. At predetermined angles Aa-c on either side of the thrust plane 26, the skirt radii smoothly increase to geometric peaks 34a–c. These peaks form the high points of the piston diameter in the cold as-formed condition and tend to concentrate the skirt loads at these points spaced from the thrust axis when the pistons are operated in engine cylinders. Progressing angularly from the peaks to the longitudinal projection of the transverse axis 25, the skirt radius generally diminishes, though preferably in a curve which first falls beyond the envelope of the corresponding nominal diameter 32 and then returns to a diameter equal to or slightly less than that diameter at the projected transverse axis 25. Although the skirt shapes may be different on the thrust and counterthrust sides of the piston, it is normally acceptable and convenient to make them identical and they are so shown in the drawings. It should be understood that, in a piston as shown in FIGS. 1 and 2, the portions of the skirt near the thrust axis are cut off by the flats 20 and so, in these zones, do not have the configurations shown in FIG. 3. However, noninterrupted piston skirts could be made with these configurations if desired.

The design of a piston skirt in accordance with the invention is accomplished first by determining by known methods, such as physical testing or finite element computer simulations, the characteristics of the engine piston-cylinder combination. These include comparative thermal growth or dimensional change during operation from cold start to maximum load and temperature. Also the range of applied forces on the piston and cylinder and the stiffnesses of the structures are determined.

The skirt shapes are then determined at a series of vertically spaced points which best fit the piston skirt to the cylinder under the maximum loaded operating conditions at high temperatures with consideration to critical warm-up conditions. Depending upon the particular cylinder and piston structures involved, this generally results in a skirt configuration which is of greatest maximum diameter in the thrust plane 26 at the thrust axis 24 which passes through the piston pin axis 23. On either side longitudinally of the thrust plane, the skirt radius is generally reduced. Further, the skirt longitudinal profile is generally of reduced diameter above and below the piston pin axis.

Figure 4:
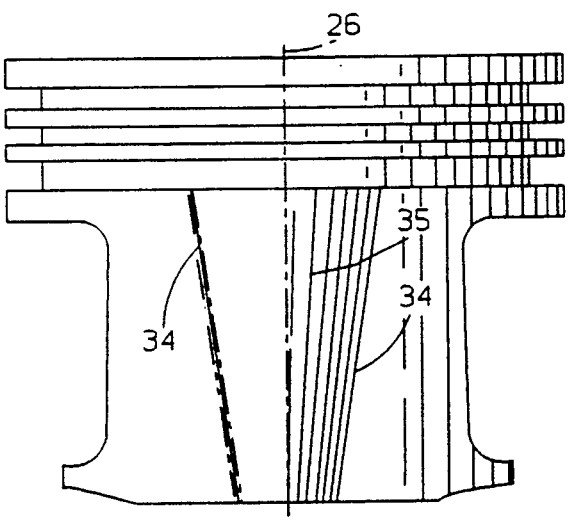
FIG. 4 is a side view of a piston having the full skirt length modified.
Figure 5:
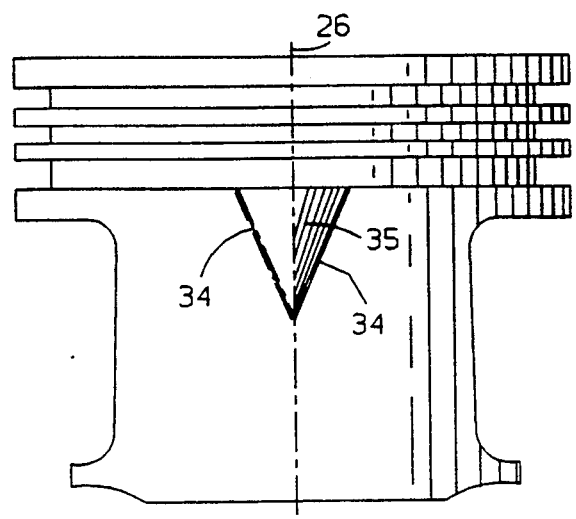
FIG. 5 is a view similar to FIG. 4 showing a partial length modification of a piston skirt.

To modify the ideal skirt shape determined from these data in accordance with the invention, I provide near the thrust plane apparent concavities as previously described by slightly reducing the skirt diameter or radius at and adjacent the thrust plane. The amount of radius or diameter reduction preferably varies with the amount of thermal growth determined at the various longitudinal locations of the skirt and so is generally greater at the top of the skirt closest to the head and ring belt and lessens as the distance from the top of the skirt is increased. The resulting maximum skirt radii at the various lateral sections along the skirt length form the ridges or geometric peaks 34 separated by relatively concave regions or concavities 35 which are shown in FIGS. 4 and 5 to extend along the full (FIG. 4) or partial (FIG. 5) length of the skirt on and beside the thrust plane 26.

To provide for ease of manufacture by computer numerical control (CNC) machining, I preferably define the resulting skirt shape by an approximating formula which generates a sinusoidal-like curve relative to the base circle 27 from which it is measured. This formula may be shown as follows:

$$SD(t, z) = ND - P(z) - C(t, x, c1, c2)$$

Where:
$SD(t, z)$ = piston skirt diameter or radius as a function of location.
$t$ = angle measured from piston thrust axis which specifies circumferential skirt location.
$z$ = distance from piston top.
$ND$ = piston sizing diameter or radius along the thrust plane.
$P(z)$ = the diametral or radial difference between ND and SD along the skirt thrust line. This is a function varying with z dimension using multiple control points that are connected using conventional interpolation techniques. This quantity is referred to as skirt longitudinal profile.

$C(t,z,c1,c2) = c1(z)[\sin^2(t) - c2(z)\sin^2(2t)]$, amount of skirt diametral or radial difference along the piston circumference, with respect to the thrust axis diameter or radius. This quantity is referred to as variable camdrop and/or transverse cross-section profile.

$c1(z), c2(z)$ = variable camdrop coefficient functions varying with z dimension using plural control points that are connected by interpolation.

The selection of coefficients c1, c2 which determine the amount of camdrop that defines the skirt transverse profile at the various longitudinal locations is a matter of design choice based upon the structural and operational evaluations discussed above to provide low friction operation while minimizing lateral piston motion.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A piston having a longitudinal axis and a skirt laterally divided by a thrust plane nominally containing the axis and extending laterally to thrust and counterthrust faces of the piston skirt, the skirt thrust face having, in an ambient temperature and unloaded condition of the piston and in planes normal to the axis over a continuous axial length extending from the top toward the bottom of the skirt, smoothly varying radii forming geometric peaks of maximum skirt radii located at angels of up to 45 degrees on either side of the thrust plane and reduced diameter portions toward the thrust plane forming an apparent concavity relative to a surrounding circular cylinder.

2. A piston having a longitudinal axis and a skirt laterally divided by a thrust plane nominally containing the axis and extending laterally to thrust and counterthrust faces of the piston skirt, the skirt counterthrust face having, in an ambient temperature and unloaded condition of the piston and in planes normal to the axis over a continuous axial length extending from the top toward the bottom of the skirt, smoothly varying radii forming geometric peaks of maximum skirt radii located at angles of up to 45 degrees on either side of the thrust plane and reduced diameter portions toward the thrust plane forming an apparent concavity relative to a surrounding circular cylinder.

3. A piston having a longitudinal axis and a skirt laterally divided by a thrust plane nominally containing the axis and extending laterally to thrust and counterthrust faces of the piston skirt, the skirt thrust and counterthrust faces having, in an ambient temperature and unloaded condition of the piston and in planes normal to the axis over a continuous axial length extending from the top toward the bottom of the skirt, smoothly varying radii forming geometric peaks of maximum skirt radii located at angles of up to 45 degrees on either side of the thrust plane and reduced diameter portions toward the thrust plane forming apparent concavities relative to a surrounding circular cylinder.

4. A piston as in claim 3 wherein the thrust face concavities extend for the full length of the skirt.

5. A piston as in claim 3 wherein the thrust face concavities extend from the top for only a partial length of the skirt.

6. A piston as in claim 1 wherein the thrust face concavity extends for the full length of the skirt.

7. A piston as in claim 1 wherein the thrust face concavity extends from the top for only a partial length of the skirt.

8. A piston having a longitudinal axis and a skirt laterally divided by a thrust plane nominally containing the axis and extending laterally to thrust and counterthrust faces of the piston skirt, at least one of the skirt thrust and counterthrust faces having, in an ambient temperature and unloaded condition of the piston and in planes normal to the axis over a continuous axial length extending from the top toward the bottom of the skirt, smoothly varying radii forming geometric peaks of maximum skirt radii located at angles of up to 45 degrees on either side of the thrust plane and reduced diameter portions toward the thrust plane forming an apparent concavity relative to a surrounding circular cylinder, said continuous axial length of the skirt being configured in accordance with the formula:

$$SI(t,z) = ND - P(z) - C(t,z,c1,c2)$$

where
$SD(t,z)$ = piston skirt diameter or radium as a function of location;
t = angles measured from piston thrust axis which specified circumstantial skirt location;
z = distance from piston top;
ND = piston sizing diameter or radius along the thrust plane;
$P(z)$ = the diametral or radial difference between ND and SD along the skirt thrust line, represents skirt longitudinal profile;
$C(t,z,c1,c2) = c1(z)[\sin^2(t) - c2(z)\sin^2(2t)]$, the diametral or radial difference along the skirt circumference with respect to the thrust axis diameter or radius, represents variable camdrop or transverse cross section profile;
$c1(z), c2(z)$ = selected variable camdrop coefficient functions varying with z dimension.

9. A piston as in claim 8 wherein each said concavity extends for the full length of the skirt.

10. A piston as in claim 8 wherein each said concavity extends from the top for only a partial length of the skirt.

* * * * *